US010697577B2

(12) United States Patent
Fukuda

(10) Patent No.: US 10,697,577 B2
(45) Date of Patent: Jun. 30, 2020

(54) BUNDLED PROTECTIVE MEMBER

(71) Applicant: NIPPON ZIPPER TUBING KABUSHIKI KAISHA, Hyogo (JP)

(72) Inventor: Yousuke Fukuda, Kobe (JP)

(73) Assignee: NIPPON ZIPPER TUBING KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 16/305,087

(22) PCT Filed: Aug. 31, 2017

(86) PCT No.: PCT/JP2017/031423
§ 371 (c)(1),
(2) Date: Nov. 28, 2018

(87) PCT Pub. No.: WO2018/100816
PCT Pub. Date: Jun. 7, 2018

(65) Prior Publication Data
US 2019/0338882 A1    Nov. 7, 2019

(30) Foreign Application Priority Data

Dec. 1, 2016   (JP) .................................. 2016-234500

(51) Int. Cl.
*F16L 57/06* (2006.01)
*B65D 63/10* (2006.01)
*H02G 3/04* (2006.01)

(52) U.S. Cl.
CPC .......... *F16L 57/06* (2013.01); *B65D 63/1063* (2013.01); *H02G 3/0481* (2013.01)

(58) Field of Classification Search
None
See application file for complete search history.

(56) References Cited

U.S. PATENT DOCUMENTS 3,517,702 A     6/1970  Mueller et al.
3,605,200 A *   9/1971  Vallinotto ................. F16L 3/12
                                                          24/20 TT (Continued)

FOREIGN PATENT DOCUMENTS

JP     8174694 A      7/1996
JP     2003527051 A   9/2003
JP     2009201498 A   9/2009

OTHER PUBLICATIONS

Written Opinion of the International Searching Authority, Application No. PCT/JP2017,031423, dated Nov. 28, 2017. Partial English language translation.

(Continued)

*Primary Examiner* — Dimary S Lopez Cruz
(74) *Attorney, Agent, or Firm* — Renner, Otto, Boisselle & Sklar, LLP

(57) ABSTRACT

The protective cover is sheet-shaped, extruded continuously in a longitudinal direction, and made of a soft synthetic resin. The male engaging part is formed in an arrow-shape and extruded integrally with one transverse-directional end of the protective cover. The female engaging part is formed in a U-shape having hooks for stopping and extruded integrally with the other transverse-directional end of the protective cover. The tab is sheet-shaped, extruded integrally with a vicinity of a tip of the female engaging part on an inner peripheral surface of the transverse-directional protective cover, and extended by a specific length L along the inner peripheral surface of the transverse-directional protective cover.

20 Claims, 10 Drawing Sheets

(56) References Cited

U.S. PATENT DOCUMENTS

| | | | | |
|---|---|---|---|---|
| 3,925,851 | A | * | 12/1975 | Bevans .............. B65D 63/1027 24/20 TT |
| 4,502,186 | A | * | 3/1985 | Clarke .................. F16L 33/035 24/16 PB |
| 4,535,197 | A | * | 8/1985 | Butler .................. H02G 15/117 138/166 |
| 4,536,611 | A | * | 8/1985 | Butler .................... H02G 15/18 174/41 |
| 4,714,277 | A | | 12/1987 | Bachel et al. |
| 4,944,976 | A | | 7/1990 | Plummer, III |
| 5,878,465 | A | * | 3/1999 | Jenner .................. H02G 3/0468 24/16 PB |
| 8,859,898 | B2 | * | 10/2014 | Frye ..................... H02G 3/0481 138/128 |

OTHER PUBLICATIONS

International Search Report, Application No. PCT/JP2017,031423, dated Dec. 1, 2016. Partial English language translation.

\* cited by examiner

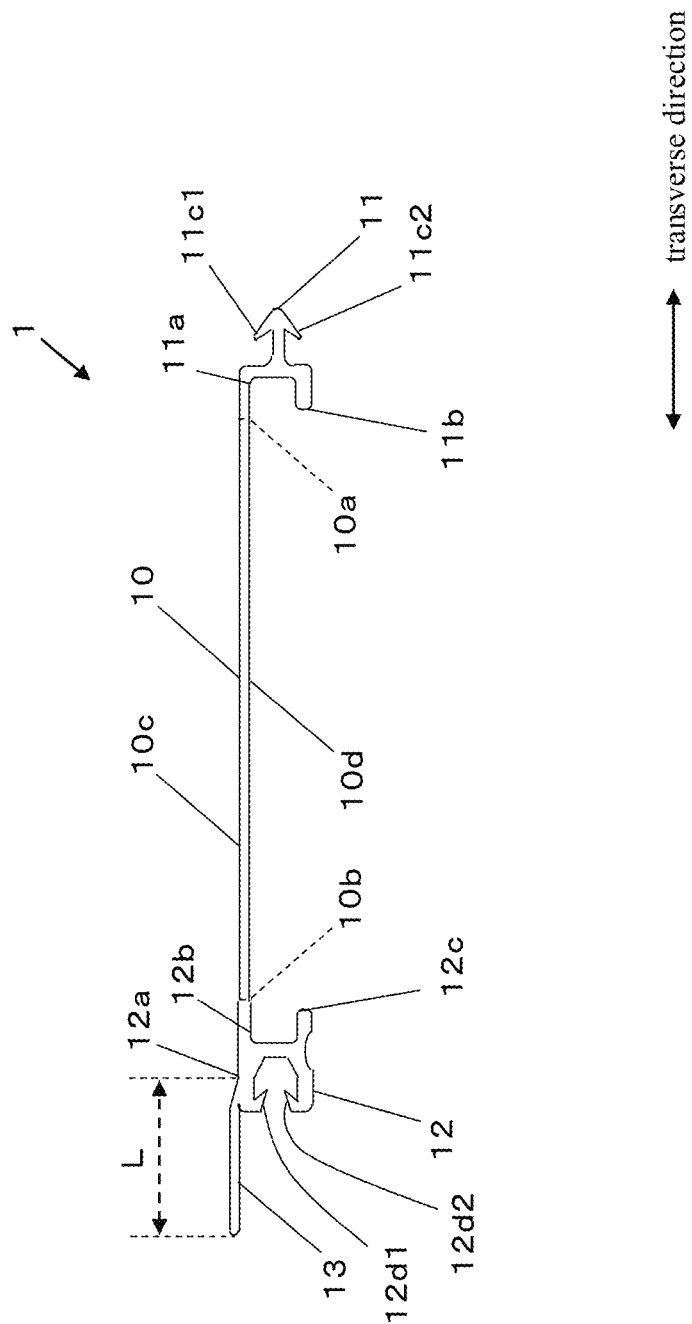
[Fig. 1]

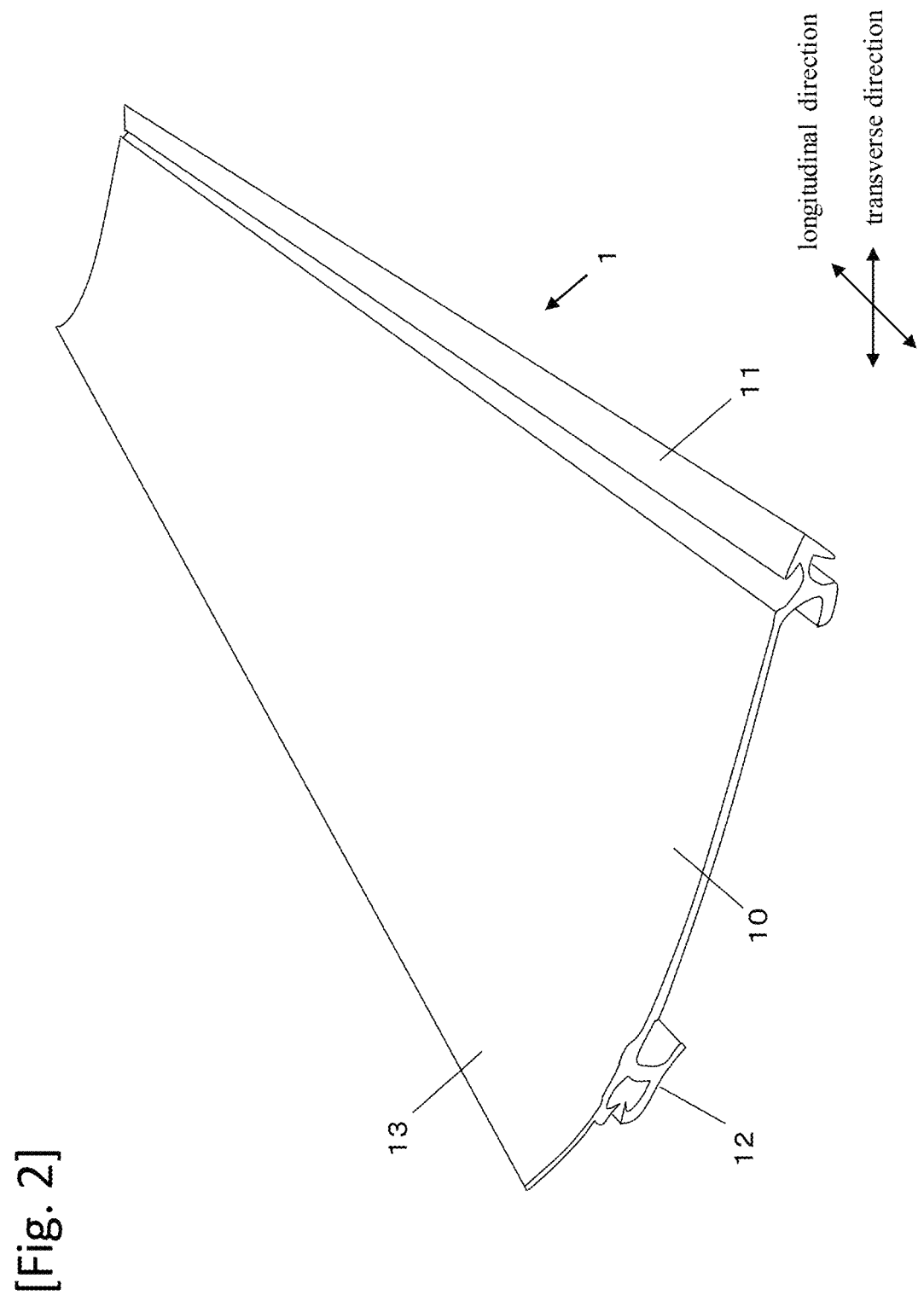
[Fig. 2]

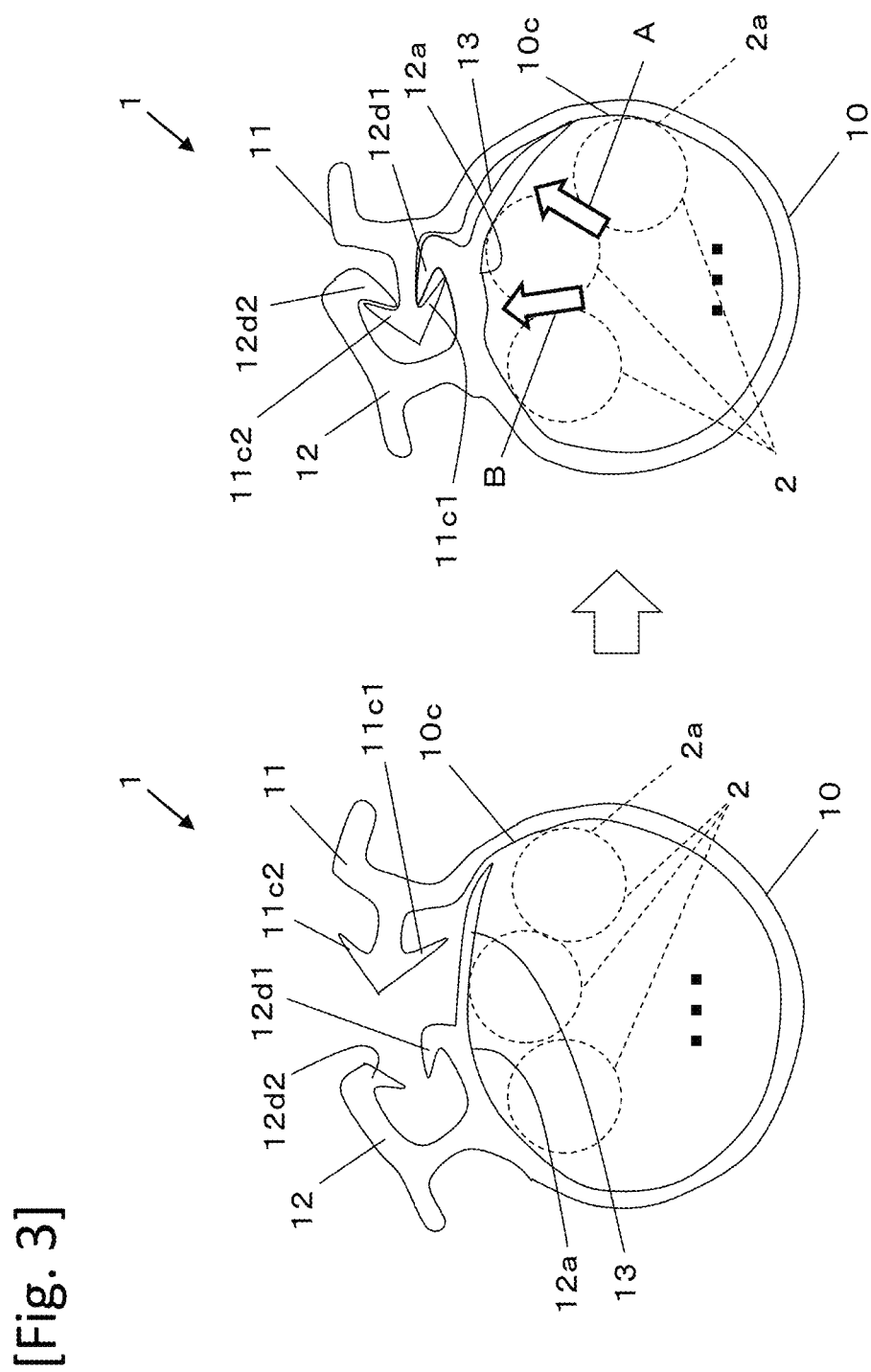
[Fig. 3]

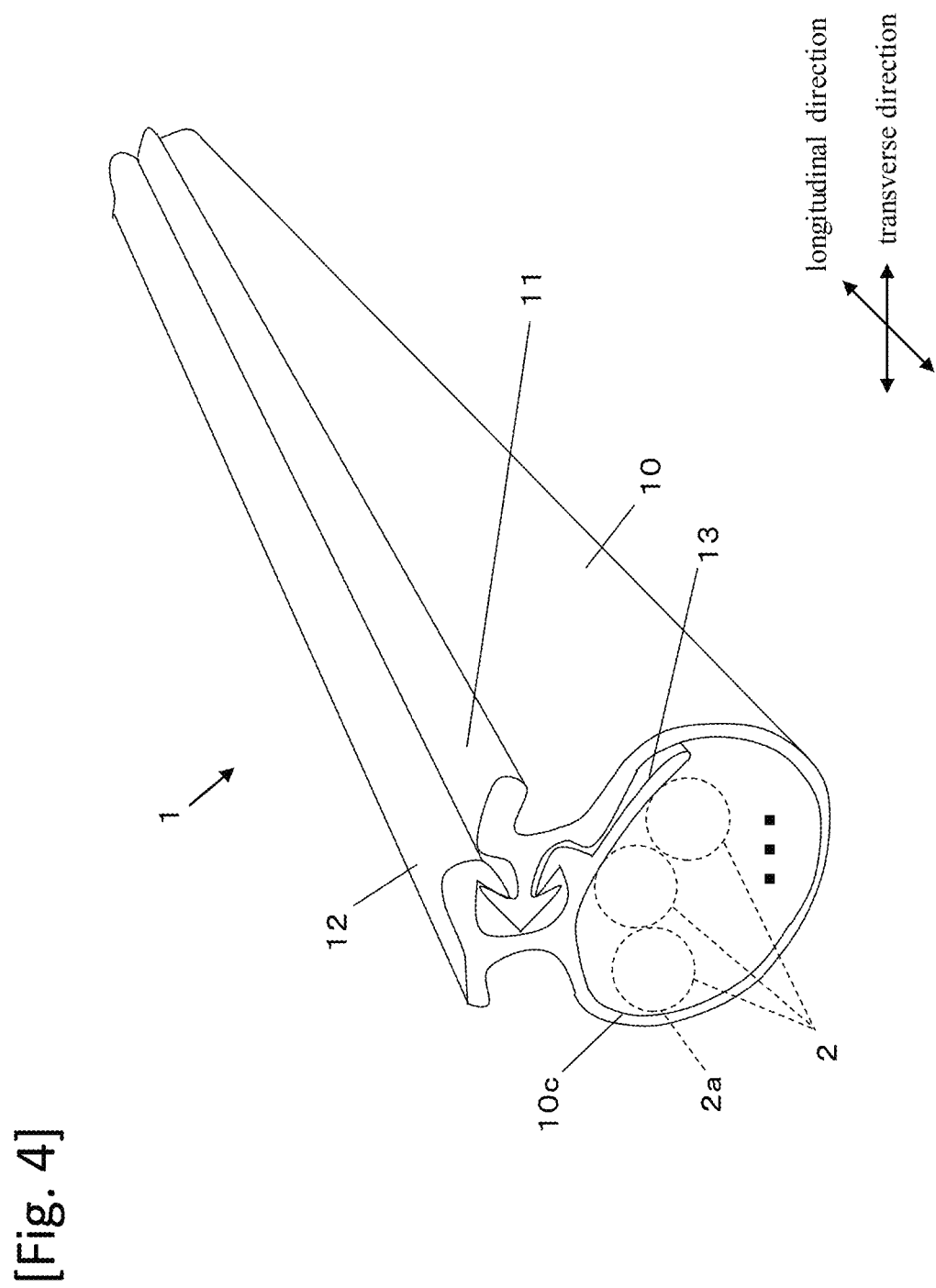

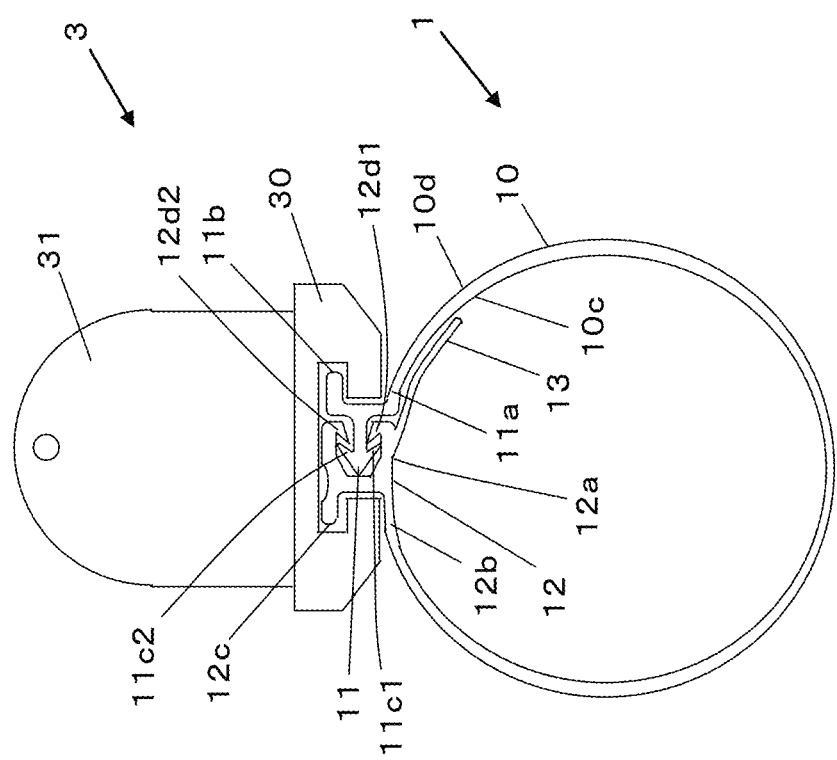
[Fig. 5]

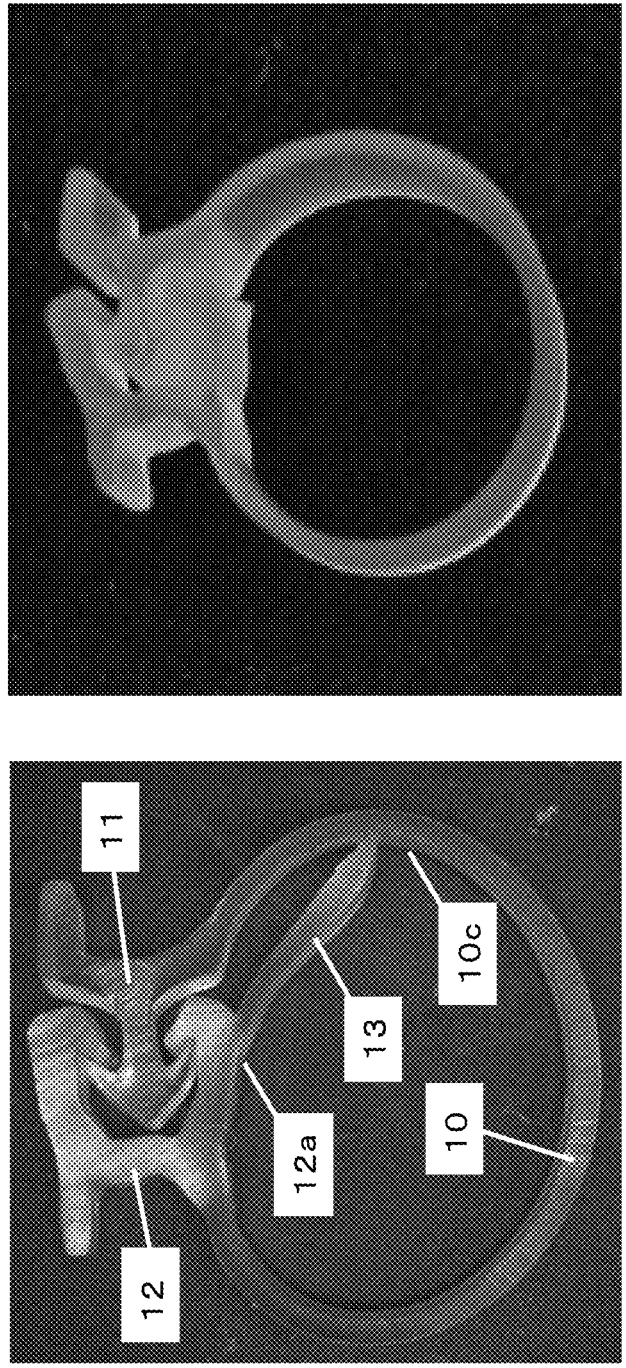
[Fig. 6]

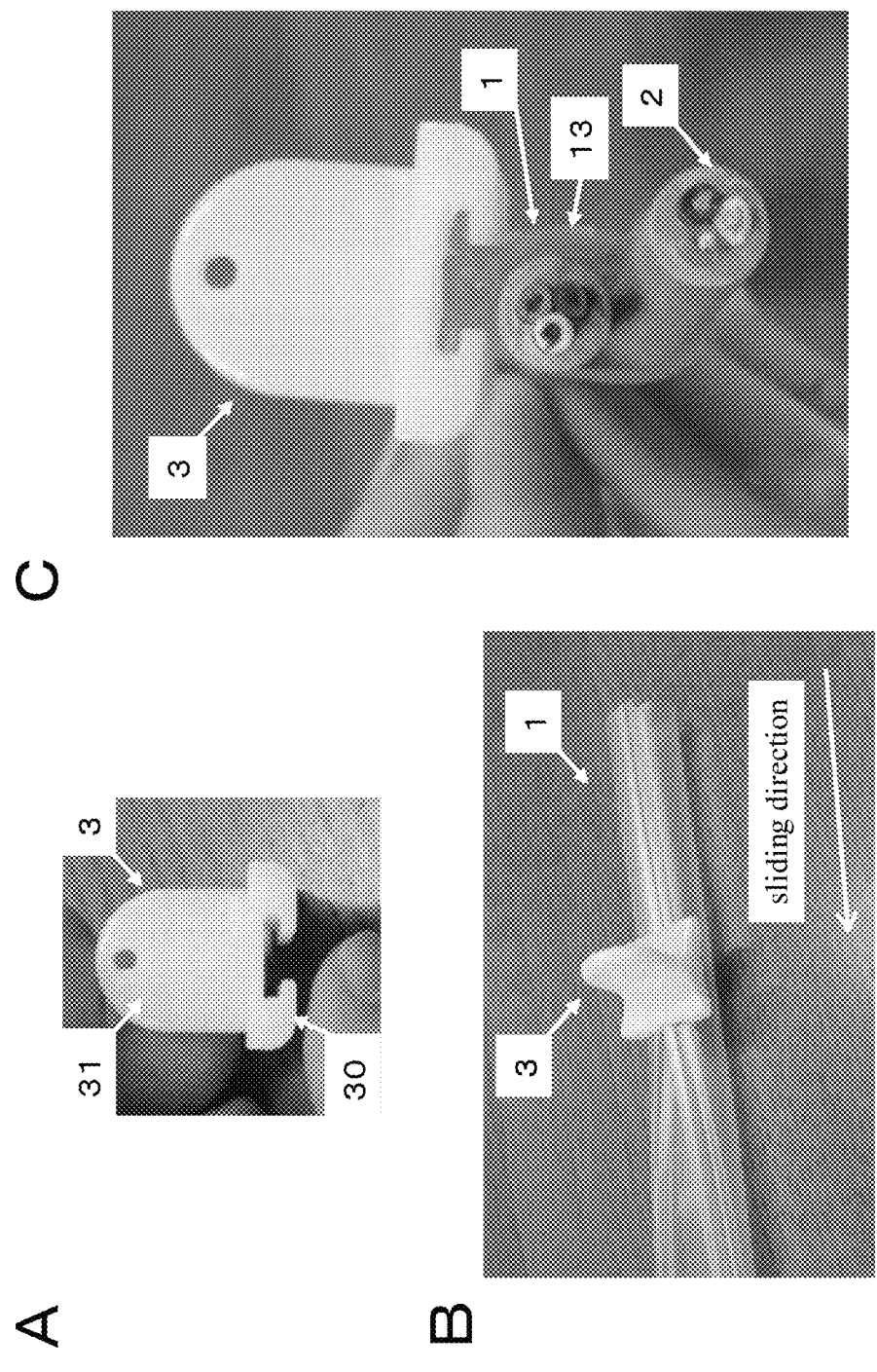

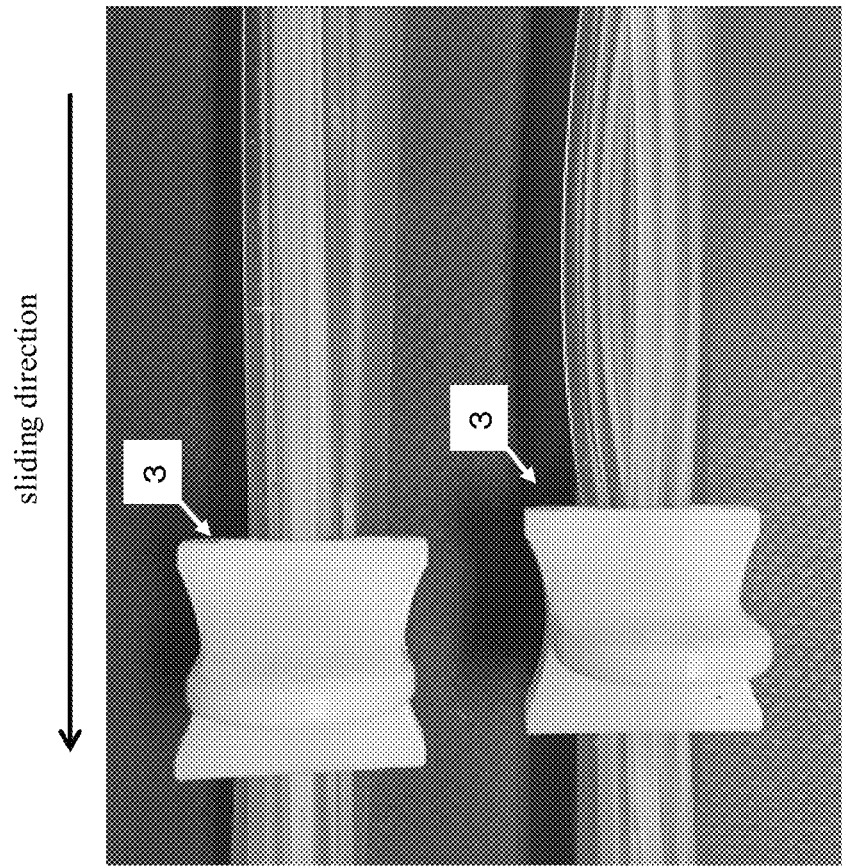
[Fig. 8]

[Fig. 9]
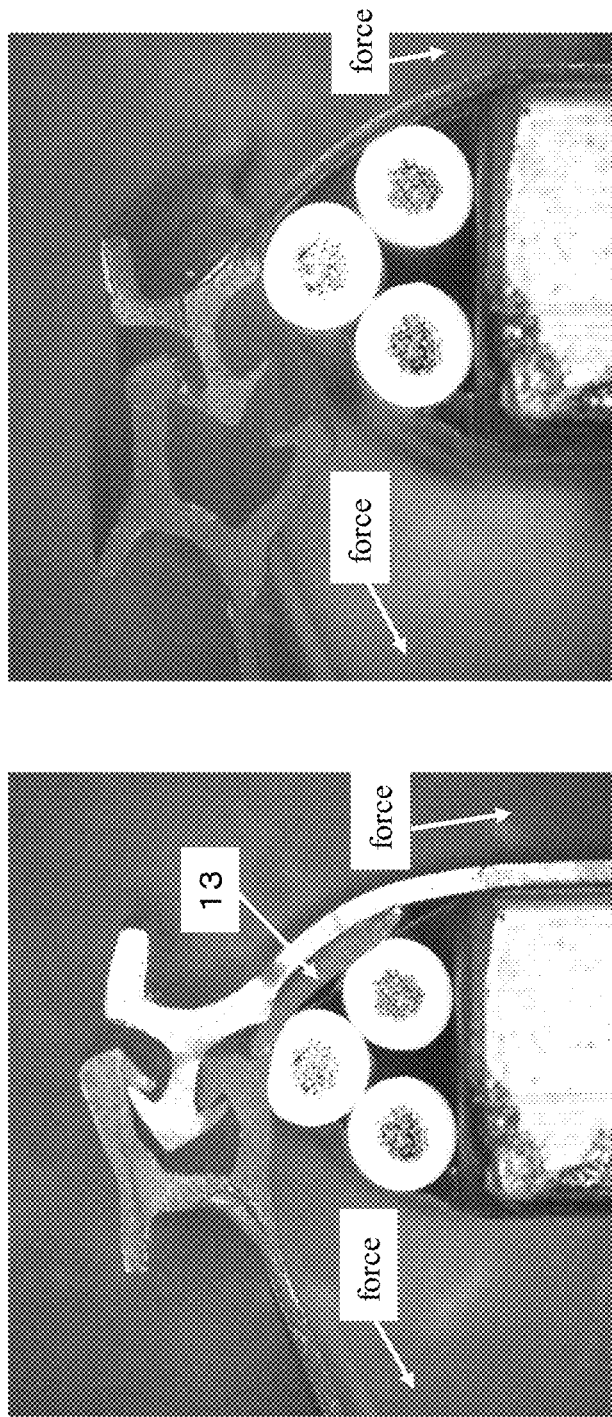

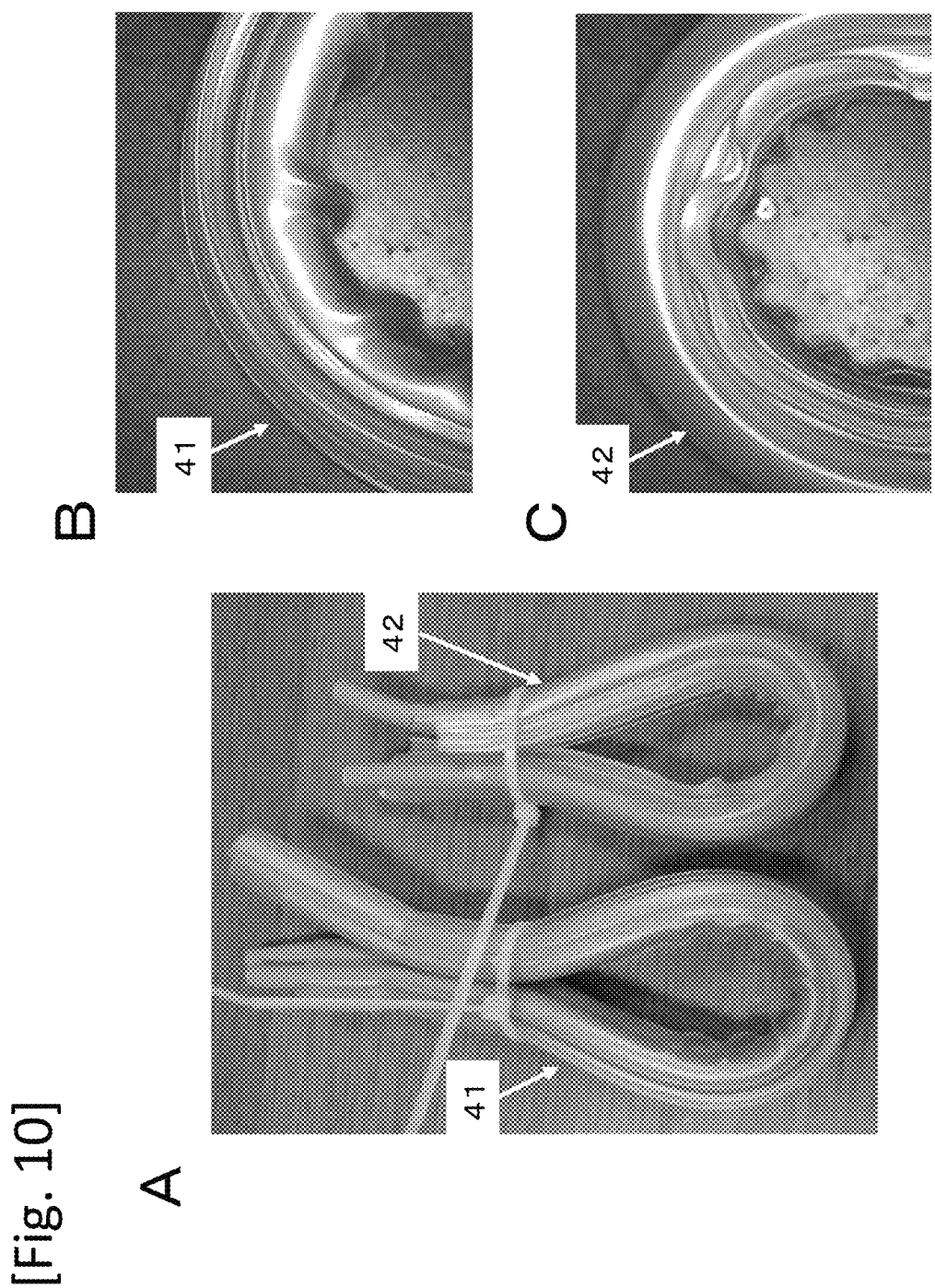
[Fig. 10]

BUNDLED PROTECTIVE MEMBER

This application is a national phase of international Application No. PCT/JP2017/031423 filed Aug. 31, 2017, which claims priority to Japanese Patent Application No. 2016-234500 filed Dec. 1, 2016, in the Japan Patent Office, which are hereby incorporated herein by reference.

TECHNICAL FIELD

The present invention relates to a bundling protective member.

BACKGROUND ART

Conventionally, technologies of a bundling protective member bundling and protecting a plurality of thread-like bodies such as electric wires or an electric wire group exist variously. For example, Patent Literature 1 discloses a tubular member comprising a protective cover, a male engaging part, a female engaging part and a tab. The protective cover is sheet-shaped, extruded continuously in a longitudinal direction, and made of a soft synthetic resin. The male engaging part is formed in an arrow-shape and extruded integrally with one transverse-directional edge of the protective cover. The female engaging part is formed in a U-shape having hooks for stopping and extruded integrally with the other transverse-directional end of the protective cover. The tab is sheet-shaped, extruded integrally with a vicinity of a tip of an inner peripheral surface (one side) of the transverse direction of the male engaging part, and extended by a specific length along the inner peripheral surface in the transverse direction of the protective cover.

Patent Literature 2 discloses a configuration that comprises a tab-shaped flap extended from a main body of a sheet. Patent Literature 3 discloses a sheet-shaped member comprising male and female member s on both end sides of the sheet, the sheet-shaped member being for use such as bundling and formed by extrusion. Patent Literature 4 discloses a member of a Durometer A hardness being less than 90 degrees as a resin hardness of a bundling member.

In addition, Patent Literature 5 discloses a tubular envelope comprising an outer cylinder, a first fastener, and a second fastener. Patent Literature 6 discloses a bundling tool for electric wires, the bundling tool obtained by applying electroless plating treatment to a surface of a synthetic resin bundling tool, the synthetic resin bundling tool comprising a bundling part to gather and bundle an electric wire group. Patent Literature 7 discloses a bundling protective member obtained by mixing a member with magnetic powder, the member protecting a wire harness bundling up electric wires.

CITATION LIST

Patent Literature

[Patent Literature 1]
U.S. Pat. No. 3,517,702
[Patent Literature 2]
U.S. Pat. No. 4,944,976
[Patent Literature 3]
Japanese Unexamined Patent Application Publication No. 8-174694
[Patent Literature 4]
Japanese Unexamined Patent Application Publication No. 2009-201498
[Patent Literature 5]
U.S. Pat. No. 5,878,465
[Patent Literature 6]
Japanese Unexamined Patent Application Publication No. 6-13764
[Patent Literature 7]
Japanese Unexamined Patent Application Publication No. 10-208556

SUMMARY OF INVENTION

Technical Problem

In a normal bundling protective member, an inner periphery of a circular arc shape is large, and a resin hardness (JIS K6253: 1997; Durometer A hardness) is high. So, it is a problem that the bundling protective member is hard as a whole and is lacking in flexibility, and an operability for a user is bad.

Especially, because most of a production of the bundling protective members are an extrusion of a synthetic resin, there are many integral extruded articles, a pair of engaging parts (closers, lockers) engaging a protective cover and the protective cover wrapping around a plurality of thread-like bodies tend to be homogenous synthetic resins.

In the case of engaging of a male engaging part and a female engaging part, the pair of the engaging parts needs a predetermined hardness. So, a synthetic resin having a high resin hardness is preferably adopted to the pair of the engaging parts. In this case, the protective cover rolled to bundle the plurality of thread-like bodies returns to an original state by the high resin hardness itself, and becomes easy to open, and it is problem that the engaging may disengage on the way.

On the other hand, if the protective cover and the pair of the engaging parts are extrusion-molded with a soft synthetic resin having a low resin hardness, although an operability for a user is improved when the protective cover wraps around a plurality of thread-like bodies, the pair of the engaging parts also becomes soft. So, the female engaging part becomes easy to disengage, it is a problem that an engaging strength that the pair of the engaging parts engage is insufficient and the engaging is easily fallen out.

To solve the problems as described above, it can not be solved by technologies described in Patent Literatures 1 to 7. For example, in the invention described in Patent Literature 1, since an inner extension (tab) and an outer extension are provided with a barbed section (male engaging part), when the barbed section engages a female section, a whole of the engaging constitutes five layers of the inner extension, a legs of the female section, a barb, a lugs of the female section and outer extension, the whole of the engaging becomes extremely hard, and it is a problem that it is difficult to bend as a whole and it is lacking in flexibility. In the invention described in Patent Literature 2, since a flap extended from an inner leg of a female member is provided, the flap merely guides (slides) the female member, and it is a problem that when a drawing force acts on a male member, the male member disengages immediately.

Accordingly, the present invention was created as a solution for the problems and aims at providing a bundling protective member that can easily bundle a plurality of thread-like bodies and maintain the bundling strongly even when extruded with a soft synthetic resin.

Solution to Problem

As a result of repeated studies zealously, the present inventor completed a new bundling protective member in the present invention. Namely, the bundling protective member in the present invention comprises a protective cover, a male engaging part, a female engaging part, and a tab. The protective cover is sheet-shaped, extruded continuously in a longitudinal direction, and made of a soft synthetic resin. The male engaging part is formed in an arrow-shape and extruded integrally with one transverse-directional end of the protective cover. The female engaging part is formed in a U-shape having hooks for stopping and extruded integrally with the other transverse-directional end of the protective cover. The tab is sheet-shaped, extruded integrally with a vicinity of a tip of the female engaging part on an inner peripheral surface of the transverse-directional protective cover, and extended by a specific length along the inner peripheral surface of the transverse-directional protective cover. The bundling protective member in the present invention is that the inner peripheral surface of the transverse-directional protective cover is wrapped around an outer periphery of a plurality of thread-like bodies, by engaging the male engaging part to the female engaging part in a state that the tab contacts with a part of the plurality of thread-like bodies, the plurality of thread-like bodies pushes up the inner peripheral surface of the transverse-directional protective cover to outside through the tab, the tab pushes up the female engaging part to outside and makes the hooks of the U-shape of the female engaging part grip the arrow-shape of the male engaging part, and the bundling protective member bundles the plurality of thread-like bodies with a band.

Advantageous Effects of Invention

According to the present invention, the present invention can easily bundle a plurality of thread-like bodies and maintain the bundling strongly even when extruded with a soft synthetic resin.

BRIEF DESCRIPTION OF DRAWINGS

FIG. 1 is a cross section view (a front view) indicating an example of a bundling protective member in the present invention.

FIG. 2 is a perspective view indicating an example of a bundling protective member in the present invention.

FIG. 3 is a cross section view indicating an example before and after engaging of a bundling protective member in the present invention.

FIG. 4 is a perspective view indicating an example after engaging of a bundling protective member in the present invention.

FIG. 5 is a front view indicating an example of a bundling protective member and an engaging slider in the present invention.

FIG. 6 is a cross section view indicating examples of an embodiment and a comparative embodiment when a male engaging part was engaged to a female engaging part.

FIG. 7A is a front view indicating an example of an engaging slider in the present invention.

FIG. 7B is a perspective view indicating an example when a bundling protective member is engaged with an engaging slider in the present invention.

FIG. 7C is a front view indicating an example when a bundling protective member in the present invention bundles a plurality of thread-like bodies with a band.

FIG. 8 is a floor view indicating examples of an embodiment and a comparative embodiment in an engaging test.

FIG. 9 is a cross section view indicating examples of an embodiment and a comparative embodiment in an engaging strength test.

FIG. 10A is a floor view indicating an example of an embodiment in a bending test.

FIG. 10B is an expansion floor view indicating an example of an outer bending of an engaging in a bending test.

FIG. 10C is an expansion floor view indicating an example of an inner bending of an engaging in a bending test.

DESCRIPTION OF EMBODIMENTS

The preferred embodiments of the present invention will be explained below according to the attached drawings; thereby the present invention will be clearly understood. The embodiments below are examples materializing the present invention, and do not limit the technical scope of the present invention.

As shown in FIGS. 1 and 2, a bundling protective member 1 in the present invention comprises a protective cover 10, a male engaging part 11, a female engaging part 12, and a tab 13. The protective cover 10 is sheet-shaped, extruded continuously in a longitudinal direction, and made of a soft synthetic resin. The male engaging part 11 is formed in an arrow-shape and extruded integrally with one transverse-directional end 10a of the protective cover 10. The female engaging part 12 is formed in a U-shape having hooks for stopping and extruded integrally with the other transverse-directional end 10b of the protective cover 10. The tab 13 is sheet-shaped, extruded integrally with a vicinity of a tip 12a of the female engaging part 12 on an inner peripheral surface 10c of the transverse-directional protective cover 10, and extended by a specific length L along the inner peripheral surface 10c of the transverse-directional protective cover 10 (in a transverse direction).

As shown in FIGS. 3 and 4, the bundling protective member in the present invention is that the inner peripheral surface 10c of the transverse-directional protective cover 10 is wrapped around an outer periphery 2a of a plurality of thread-like bodies 2 (e.g., an electric wire group), by engaging the male engaging part 11 to the female engaging part 12 in a state that the tab 13 contacts with a part of the plurality of thread-like bodies 2, the plurality of thread-like bodies 2 pushes up the inner peripheral surface 10c of the transverse-directional protective cover 10 to outside through the tab 13, the tab 13 pushes up the female engaging part 12 to outside and makes the hooks of the U-shape of the female engaging part 12 grip the arrow-shape of the male engaging part 11, and the bundling protective member 1 in the present invention bundles the plurality of thread-like bodies 2 with a band.

In this way, it is possible to easily bundle a plurality of thread-like bodies and maintain the bundling strongly even when extruded with a soft synthetic resin.

Namely, a bundling protective member bundling and protecting a plurality of thread-like bodies 2 is usually extruded integrally of a synthetic resin, if a resin hardness of the synthetic resin is made lower and soften, a male engaging part and a female engaging part become soften. When an arrow-shape of the male engaging part tries to be put in hooks of a U-shape of the female engaging part, the male engaging part and the female engaging part are easily bent and deformed, so that a failure to engage the male engaging part to the female engaging part was conspicuous. And, when the male engaging part was engaged to the female engaging part, a stopping degree and a engaging degree of the female engaging part were weakened, and a rate of disengaging after engaging became high. While, if the resin hardness of the synthetic resin is made higher, a protective cover becomes easy to open. So, by lengthening a length of the transverse-directional protective cover, it was necessary to be larger a radius of a circle of the protective cover formed when the protective cover bundles the plurality of thread-like bodies 2.

The present invention comprises the tab 13 to the female engaging part 12, by contacting the tab 13 with the part of the plurality of thread-like bodies 2, so that the tab performs a role as the guide for bring the arrow-shape of the male engaging part 11 to the hooks of a U-shape of the female engaging part 12. In this way, even if a bending and a deforming of the male engaging part 11 and the female engaging part 12 occur, the male engaging part 11 is thrust into the female engaging part 12 along the tab 13, the arrow-shape of the male engaging part 11 is just inserted into the hooks of a U-shape of the female engaging part 12. It is possible to easily engage the male engaging part 11 to the female engaging part 12 without causing a failure to engage.

After engaging, as shown in FIG. 3, a shape (cross-sectional shape) of the transverse-directional protective cover 10 becomes a circle, the plurality of thread-like bodies 2 is filled along an inner peripheral surface 10$c$ of the transverse-directional circular protective cover 10. Here, by bundling the bundling protective member 1 in a state that the tab 13 is contacted with the part of the plurality of thread-like bodies 2, a first arrow A force that the plurality of thread-like bodies 2 pushes up the inner peripheral surface 10$c$ of the transverse-directional protective cover 10 to outside through the tab 13 acts. By the first arrow A force, a second arrow B force that the tab 13 pushes up the female engaging part 12 to outside from a near tip 12$a$ of the female engaging part 12 on the inner peripheral surface 10$c$ of the transverse-directional protective cover 10 acts. Namely, the tab 13 pushes up the female engaging part 12 to outside by filling the plurality of thread-like bodies 2 and performs a role to engage (close) the hooks of a U-shape of the female engaging part 12. The tab 13 makes the hooks of a U-shape of the female engaging part 12 firmly grip the arrow-shape of the male engaging part 11 by the first arrow A force and the second arrow B force, it is possible to increase the engaging strength and to reduce the rate of disengaging after engaging to zero.

In addition, so the bundling protective member 1 is made of a soft synthetic resin, the protective cover 10 becomes soft. Even if a whole body is bent after bundling the plurality of thread-like bodies 2, due to a flexibility of the protective cover 10, it is possible to moderately absorb wrinkles generated at the time of bending. Further, so the engaging strength is high by the tab 13, it is possible to reduce the rate of disengaging when the bending to zero.

Here, for example, the arrow-shape of the male engaging part 11 is preferably formed like an isosceles triangle in cross-sectional shape. Namely, the arrow-shape of the male engaging part 11 has both arrowhead shapes and does not have a form of a harpoon with only one side sharpened. In this way, both side ends of the isosceles triangle of the arrow-shape of the male engaging part 11 are respectively caught by the hooks of the U-shape of the female engaging part 12, the hooks of the U-shape of the female engaging part 12 firmly grip the isosceles triangle of the arrow-shape of the male engaging part 11 by pushing of the tab 13, so that the engaging strength is increased.

Further, for example, the arrow-shape of the male engaging part 11 is preferably formed like a shape having a feather-formed part 11$c$1, 11$c$2 which extends from a tip to both sides in cross-sectional shape, and the hooks 12$d$1, 12$d$2 of the U-shape of the female engaging part 12 preferably are shaped such that their respective tips are approaching each other toward the inside. In this way, an inner feather-formed part 11$c$1 of the arrow-shape of the male engaging part 11 is caught by an inner hook 12$d$1 of the U-shape of the female engaging part 12, and an outer feather-formed part 11$c$2 of the arrow-shape of the male engaging part 11 is caught by an outer hook 12$d$2 of the U-shape of the female engaging part 12, so that the arrow-shape of the male engaging part 11 becomes difficult to disengage from the U-shape of the female engaging part 12. Further the inner feather-formed part 11$c$1 is caught by the inner hook 12$d$1, in addition of the pushing of the tab 13 to outside, a pushing of the female engaging part 12 to outside is strengthened, so that the engaging strength is further enhanced.

And, for example, the tab 13 is preferably extruded integrally near the tip 12$a$ of the female engaging part 12 on the inner peripheral surface 10$c$ of the transverse-directional protective cover 10 and a side (not tip) of the inner hook 12$d$1 of the U-shape of the female engaging part 12. In this way, so the tab 13 extends from the side of the inner hook 12$d$1 of the U-shape of the female engaging part 12, the tab 13 becomes easy to push the inner hook 12$d$1 of the U-shape of the female engaging part 12 to outside by filling the plurality of thread-like bodies 2, thereby a gripping force of the female engaging part 12 is enhanced.

The resin hardness (JIS K6253: 1997; Durometer A hardness) of the soft synthetic resin is not particularly limited, for example, is preferably less than 90 degrees, and is more preferably within a range from 60 degrees to 80 degrees. A synthetic resin having such the resin hardness can be adopted such as a vinyl chloride resin, a polyurethane resin, a thermoplastic polyurethane (TPU), a polyethylene resin, a polypropylene resin, a silicone resin, or the like.

The specific length L of the transverse-directional tab 13 is not particularly limited, for example, is preferably within a range from 1.0 to 1.5 times the length of the transverse-directional female engaging part 12. In this way, when the male engaging part 11 is engaged to the female engaging part 12, since the tab 13 extends, so that the male engaging part 11 can be placed thereon, a positioning of the tab 13 is good. When the male engaging part 11 is placed on the tab 13 and pushed to the female engaging part 12 along the tab 13, the role of the guide of the tab 13 is sufficiently performed. So, it is easy to engage the male engaging part 11 into the female engaging part 12, and it is possible to improve an operability of a user who bundles the plurality of thread-like bodies 2. While, if the tab 13 is too long, the tab 13 becomes an obstacle when the protective cover 10 is wrapped around the plurality of thread-like bodies 2, so that it is not preferable. If the tab 13 is too short, it is difficult to place the male engaging part 11 on the tab 13, the role of the guide of the tab 13 is spoiled, so that it is not preferable.

A thickness of the tab 13 is not particularly limited, for example, is preferably equal to or less than a thickness of the protective cover 10. In this way, the tab 13 overlaps the part of the inner peripheral surface of the protective cover 10 rounded for bundling the plurality of thread-like bodies 2, the tab 13 takes a space at the time of the bundling. By making the thickness of the tab 13 equal to or less than the thickness of the protective cover 10, it is possible to attain space saving. The thickness of the tab 13, for example, is equal to or half the thickness of the protective cover 10. And, a tip shape of the tab 13 is not particularly limited, for example, is preferably a semicircular shape or a pointed shape. The higher a filling rate of the plurality of thread-like bodies 2 to the bundling protective member 1, the more the plurality of thread-like bodies 2 contact with the tab 13, so that it is preferable.

Thicknesses of the male engaging part 11 and the female engaging part 12 is not particularly limited, for example, is preferably 2 times or more the thickness of the protective cover 10, and more preferably 4 times or more. In this way, since the arrow-shape of the male engaging part 11 and the hooks of the U-shape of the female engaging part 12 are enlarged, it is easy to engage the male engaging part 11 to the female engaging part 12. By thickening the male engaging part 11 and the female engaging part 12, even if the male engaging part 11 and the female engaging part 12 are extruded integrally with a soft synthetic resin together with the protective cover 10, strengths of the male engaging part 11 and the female engaging part 12 are secured. It is possible to enhance the engaging strength of the female engaging part 12 to the male engaging part 11 together with the effect of the tab 13.

A length of the transverse-directional protective cover 10 is not particularly limited, for example, is preferably to set a diameter of the circular protective cover 10 when the male engaging part 11 was engaged to the female engaging part 12 within a range from 8 mm to 16 mm. In the present invention, by providing the tab 13, even if a soft synthetic resin is used, it is possible to enhance the engaging strength. So, for example, it is optimum as a bundling protective member 1 having a small diameter. In addition, if a hard synthetic resin is used, a bundling protective member having this small diameter can not be properly bundled due to a high hardness of its own synthetic resin.

A type of an extrusion molding of the bundling protective member 1 is not particularly limited, as described above, a single type extrusion that only one type of soft synthetic resin is extruded may be used, or a two-type extrusion that two types of soft synthetic resin and hard synthetic resin are extruded may be used. In the case of the two-type extrusion, for example, a hard synthetic resin may be used for the male engaging part 11 and/or the female engaging part 12 required to have a high resin hardness, and a soft synthetic resin may be used for the protective cover 10 and the tab 13.

AN engaging slider 3 may be provided with the bundling protective member 1. For example, as shown in FIGS. 1 and 5, the bundling protective member 1 comprises a first groove 11b provided on a root of the male engaging part 11 and on an outer peripheral surface 10d of the transverse-directional protective cover 10, a second groove 12c provided on a root of the female engaging part 12 and on an outer peripheral surface 10d of the transverse-directional protective cover 10, and corresponding to the first groove 11b, and the engaging slider 3. The engaging slider 3 comprises a U-shaped holding part 30 holding in the first groove 11b and the second groove 12c when the protective cover 10 is rounded and the male engaging part 11 is engaged to the female engaging part 12, and a grip part 31 for gripping the holding part 30. And, the protective cover 10 is wrapped around the plurality of thread-like bodies 2, the holding part 30 of the engaging slider 3 is put in the first groove 11b of the male engaging part 11 and the second groove 12c of the female engaging part 12 in a state that the male engaging part 11 is placed on the tab 13, the grip part 31 of the engaging slider 3 is hold, the engaging slider 3 is slid along a longitudinal direction of the protective cover 10, so that the bundling protective member 1 bundles the plurality of thread-like bodies 2 with a band. In this way, the holding part 30 attracts the first groove 11b and the second groove 12c to a center of the U-shape, it is possible to engage the male engaging part 11 to the female engaging part 12 automatically and quickly in a state that the plurality of thread-like bodies 2 pushes the tab 13 to outside.

The grip part 31 of the engaging slider 3, for example, extends from the holding part 30 to outside in a direction orthogonal to a sliding direction of the engaging slider 3, but this configuration is not particularly limited. For example, the grip part 31 may be provided on both sides of the holding part 30 in a neck shape. In this way, by holding the holding part 30 in the first groove 11b of the male engaging part 11 and the second groove 12c of the female engaging part 12 and sliding in the sliding direction with pinching the neck shape of the grip part 31 with the thumb and the forefinger, it is possible to engage smoothly.

In addition, the first groove 11b and the second groove 12c can be utilized for the engaging of the male engaging part 11 and the female engaging part 12 by using various methods. As described above, the engaging slider 3 may be used, or the first groove 11b and the second groove 12c of the bundling protective member 1 may be close to each other and engaged by hand without using the engaging slider 3. When engaging by hand, the male engaging part 11 and the female engaging part 12 may be intermittently engaged. The configuration of the slider 3 is not particularly limited, and for example, a screw may be provided to the holding part 30 so that the screw is pierced into a substrate or a wall surface. The holding part 30 comprises a first holding part and a second holding part by dividing the holding part 30 at the center. The first holding part and the second holding part are provided at tips of a pair of openable and closable pieces, the pieces rotatably connected to a pivot shaft. In this way, by fitting the first holding part and the second holding part to the first groove 11b and the second groove 12c respectively and closing the pair of pieces, it is possible to engage the male engaging part 11 to the female engaging part 12.

The present invention comprises a conductive layer from the male engaging part 11 to a side of the female engaging part 12 and both sides of a transverse-directional tab 13 along the inner peripheral surface 10c of the transverse-directional protective cover 10, so that a function as an electromagnetic wave shield may be imparted. Namely, in the present invention, when bundling the plurality of thread-like bodies 2, the tab 13 extended from the female engaging part 12 is pushed by the plurality of thread-like bodies 2 and contacts with the male engaging part 11 forcibly. By comprising the above-described conductive layer, the conductive layer of the tab 13 contacts with the conductive layer of the male engaging part 11 and continues to the conductive layer of the female engaging part 12, so that the plurality of thread-like bodies 2 is surrounded by one conductive layer and a function of the electromagnetic wave shield can be exhibited.

Here, the conductive layer can cite such as an aluminum layer, and a method (laminating method) of attaching an aluminum foil (aluminum sheet) to the inner peripheral surface 10c of the transverse-directional protective cover 10, a method of aluminum vapor deposition, an aluminum plating method, or the like can be used. As the conductive layer, aluminum foil, copper foil, conductive cloth or the like can be used, and a method of sticking a fabric of a resin (polyester, nylon, etc.) plated with metal such as copper, nickel or the like to the inner peripheral surface 10c of the transverse-directional protective cover 10 can be used.

A type of the plurality of thread-like bodies 2 is not particularly limited, and anything that can be subject to bundling protection may be used. As a thread-like body, for example, an electric wire group formed by bundling a plurality of independent electric wires, a wire harness that a plurality of electric wires is bundled in advance, a flexible tube through a fluid such as a gas or a liquid flow, an insulating string or the like can be adopted.

Embodiments, Etc.

The present invention will be explained below according to Embodiments, Comparative embodiments, etc., and does not limit by there.

First, an extrusion molding mold for a bundling protective member is prepared based on FIGS. 1 and 2, using the extrusion molding mold and a soft synthetic resin having a resin hardness of 80 degrees (JIS K 6253: 1997; Durometer A hardness), a protective cover 10, a male engaging part 11, a female engaging to part 12 and a tab 13 are extruded integrally. In this way, the extruded bundling protective member 1 was used as an embodiment. While, using a conventional extrusion molding mold without a tab and with the above-mentioned soft synthetic resin, a protective cover, a male engaging part and a female engaging part are extruded integrally. In this way, the extruded bundling protective member was used as a comparative embodiment.

FIG. 6 is a cross section view indicating examples of an embodiment and a comparative embodiment when a male engaging part was engaged to a female engaging part. As shown in FIG. 6, in the embodiment, the tab 13 was extended with a vicinity of a tip 12a of the female engaging part 12 on an inner peripheral surface 10c of the transverse-directional protective cover 10 and is contacted with the inner peripheral surface 10c of the transverse-directional protective cover 10 and a side of the male engaging part 11. While, in the comparative embodiment, a tab 13 does not exist. In the embodiment and the comparative embodiment, a first groove was provided to the male engaging part 11, and a second groove was provided to the female engaging part 12, respectively.

Next, as shown in FIG. 7A, an engaging slider 3 having a holding part 30 and a grip part 31 was produced corresponding to the first groove and the second groove of the embodiment and the comparative embodiment. As a plurality of thread-like bodies, an electric wire group was used, and an operability of the engaging slider 3 was confirmed in a case that there was no electric wire group in the embodiment. First, in a state that the male engaging part of the embodiment is placed on the tab, the holding part of the engaging slider 3 is put in the first groove of the male engaging part and the second groove of the female engaging part, when the engaging slider 3 is slid along a longitudinal direction of the protective cover 10, as shown in FIG. 7B, it was possible to easily engage the male engaging part to the female engaging part. Next, in a case that there was the electric wire group 2 in the embodiment, using the engaging slider 3, as shown in FIG. 7C, in a state that the protective cover 10 was wrapped around the group of electric wires 2, it was possible to easily engage the male engaging part to the female engaging part.

Using the engaging slider 3, engaging tests of the male engaging part and the female engaging part in the embodiment and the comparative embodiment were carried out. The embodiment and the comparative embodiment being a predetermined length (10 cm) in a longitudinal direction were prepared, a same operator put the holding part of the engaging slider 3 in the first groove of the male engaging part and the second groove of the female engaging part and slid, and confirmed whether or not the engaging of the male engaging part 11 to the female engaging part 12 was carried out properly.

As a result, as shown in FIG. 8, in the embodiment, the tab 13 performs a role as a guide, the male engaging part 11 was engaged to the female engaging part 12 along the tab 13, so that a failure to engage did not occur. While, in the comparative embodiment, since there is no tab 13, the male engaging part is drawn to the female engaging part only by the holding part of the engaging slider 3. Since the resin hardness is low, the male engaging part and the female engaging part were bent or deformed, the engaging of the male engaging part to the female engaging part failed, and the engaging slider 3 was passed through without engaging the male engaging part to the female engaging part. In this way, it was found that the tab 13 performs the role as the guide at the time of engaging and prevents failure to engage.

Next, engaging strength tests of the male engaging part and the female engaging part in the embodiment and the comparative embodiment were carried out. In the engaging strength test, three electric wires were simulatedly fixed to a base to form an electric wire group, the male engaging part and the female engaging part after engaging were arranged upon the electric wire group, forces were applied to the male engaging part and the female engaging part in different directions (for example, in the direction of reversed V-shape), and it was confirmed whether or not the engaging of the male engaging part and the female engaging part was disengaged.

As a result, as shown in FIG. 9, in the embodiment, the electric wire group pushed up the inner peripheral surface of the transverse-directional protective cover 10 through the tab 13 (a first arrow A force in FIG. 3). In this way, the female engaging part was pushed up to outside following the tab 13 (a second arrow B force in FIG. 3), hooks of a U-shape of the female engaging part firmly gripped an arrow-shape of the male engaging part, and the engaging of the male engaging part and the female engaging part never disengage. While, in the comparative embodiment, since there was no tab 13, when forces were applied to the male engaging part and the female engaging part in different directions, the resin hardness was low, so that the engaging was immediately disengaged. In this way, it was found that the tab 13 enhances the engaging strength after engaging and reliably prevents disengaging of the engaging.

Finally, a bending test of the bundling protective member in the embodiment was carried out. Since the bundling protective member bundling the electric wire group has a low resin hardness, it is a possibility that the bundling protective member is bent at various places. If the bundling protective member after engaging bent, it is necessary that the engaging is not easily disengaged. Therefore, the bundling protective member bundling the electric wire group was folded at about 180 degrees and bent, and it was confirmed at that time whether or not the engaging of the male engaging part and the female engaging part was disengaged. Here, as shown in FIG. 10A, a bundling protective member 41 bending with the engaging of the male engaging part and the female engaging part outward and a bundling protective member 42 bending with the engaging of the male engaging part and the female engaging part inward were prepared.

As a result, as shown in FIG. 10B, in the bundling protective member 41 bending with the engaging of the male engaging part and the female engaging part outward, the engaging of the male engaging part and the female engaging part was not disengaged. And, in the bundling protective member 42 bending with the engaging of the male engaging part and the female engaging part inward, as shown in FIG. 10C, the engaging of the male engaging part and the female engaging part was not disengaged. It was shown that the bundling protective member is made of soft synthetic resin, flexibility is improved as a whole, wrinkles generated at the time of bending are moderately absorb, so the engaging strength is high by the tab 13, it reliably prevents disengaging of the engaging at the time of bending.

Thus, in the embodiment, good results were obtained in all of the engaging test, the engaging strength test, and the bending test, and this proved to be due to the tab 13. In addition, in the above description, the engaging slider 3 was used, but a similar working effect was obtained even if the male engaging part was engaged to the female engaging part by another method.

INDUSTRIAL APPLICABILITY

As described above, the bundling protective member is useful as a bundling protective member for a plurality of thread-like bodies in all fields such as electric/electronic field, mechanical field, automobile field, construction field. It is effective as the bundling protective member that can easily bundle a plurality of thread-like bodies and maintain the bundling strongly even when extruded with a soft synthetic resin.

REFERENCE SIGNS LIST

1 Bundling protective member
10 Protective cover
11 Male engaging part
12 Female engaging part
13 Tab

The invention claimed is:

1. A bundling protective member comprising:
a protective cover being sheet-shaped, extruded continuously in a longitudinal direction, and made of a soft synthetic resin;
a male engaging part being formed in an arrow-shape, and extruded integrally with one transverse-directional end of the protective cover;
a female engaging part being formed in a U-shape having hooks for stopping, and extruded integrally with another transverse-directional end of the protective cover; and
a tab being sheet-shaped, extruded integrally with a vicinity of a tip of the female engaging part on an inner peripheral surface of a transverse-directional protective cover, and extended by a specific length along the inner peripheral surface of the transverse-directional protective cover;
wherein the inner peripheral surface of the transverse-directional protective cover is wrapped around an outer periphery of a plurality of thread-like bodies, by engaging the male engaging part to the female engaging part in a state that the tab contacts with a part of the plurality of thread-like bodies, the plurality of thread-like bodies pushes up the inner peripheral surface of the transverse-directional protective cover to outside through the tab, the tab pushes up the female engaging part to outside of the protective cover and makes the hooks of the U-shape of the female engaging part grip the arrow-shape of the male engaging part, and the bundling protective member bundles the plurality of thread-like bodies.

2. The bundling protective member according to claim 1, wherein:
a resin hardness of the soft synthetic resin is less than 90 degrees.

3. The bundling protective member according to claim 2, wherein:
when a first force that the plurality of thread-like bodies pushes up the inner peripheral surface of the transverse-directional protective cover to outside through the tab acts, a second force that the tab pushes up the female engaging part to outside of the protective cover from a near part of the tip of the female engaging part on the inner peripheral surface of the transverse-directional protective cover acts, wherein the hooks of the U-shape of the female engaging part grip the arrow-shape of the male engaging part.

4. The bundling protective member according to claim 3, wherein:
a thickness of the tab is equal to a thickness of the protective cover, and thicknesses of the male engaging part and the female engaging part are 2 times the thickness of the protective cover.

5. The bundling protective member according to claim 4, wherein:
the tab is extruded integrally with the vicinity of the tip of the female engaging part on the inner peripheral surface of the transverse-directional protective cover and a side of an inner hook being part of the hooks of the U-shape of the female engaging part.

6. The bundling protective member according to claim 5, wherein:
the arrow-shape of the male engaging part is formed like an isosceles triangle in a cross-sectional shape.

7. The bundling protective member according to claim 5, wherein:
the arrow-shape of the male engaging part is formed like a shape having a feather-formed part which extends from a tip of the male engaging part to both sides of the male engaging part in a cross-sectional shape, and the U-shape-formed hooks of the female engaging part are shaped such that respective tips of the U-shape of the female engaging part are approaching each other toward the inside.

8. The bundling protective member according to claim 1, wherein:
when a first force that the plurality of thread-like bodies pushes up the inner peripheral surface of the transverse-directional protective cover to outside through the tab acts, a second force that the tab pushes up the female engaging part to outside of the protective cover from a near part of the tip of the female engaging part on the inner peripheral surface of the transverse-directional protective cover acts, wherein the hooks of the U-shape of the female engaging part grip the arrow-shape of the male engaging part.

9. The bundling protective member according to claim 8, wherein:
a thickness of the tab is equal to a thickness of the protective cover, and thicknesses of the male engaging part and the female engaging part are 2 times the thickness of the protective cover.

10. The bundling protective member according to claim 9, wherein:
the tab is extruded integrally with the vicinity of the tip of the female engaging part on the inner peripheral surface of the transverse-directional protective cover and a side of an inner hook being part of the hooks of the U-shape of the female engaging part.

11. The bundling protective member according to claim 10, wherein:

the arrow-shape of the male engaging part is formed like an isosceles triangle in a cross-sectional shape.

12. The bundling protective member according to claim 10, wherein:

the arrow-shape of the male engaging part is formed like a shape having a feather-formed part which extends from a tip of the male engaging part to both sides of the male engaging part in a cross-sectional shape, and the U-shape-formed hooks of the female engaging part are shaped such that that respective tips of the U-shape of the female engaging part are approaching each other toward the inside.

13. The bundling protective member according to claim 11, wherein:

the tab is extruded integrally with the vicinity of the tip of the female engaging part on the inner peripheral surface of the transverse-directional protective cover and a side of an inner hook being part of the hooks of the U-shape of the female engaging part.

14. The bundling protective member according to claim 12, wherein:

the tab is extruded integrally with the vicinity of the tip of the female engaging part on the inner peripheral surface of the transverse-directional protective cover and a side of an inner hook being part of the hooks of the U-shape of the female engaging part.

15. The bundling protective member according to claim 1, wherein:

a thickness of the tab is equal to a thickness of the protective cover, and thicknesses of the male engaging part and the female engaging part are 2 times the thickness of the protective cover.

16. The bundling protective member according to claim 15, wherein:

the tab is extruded integrally with the vicinity of the tip of the female engaging part on the inner peripheral surface of the transverse-directional protective cover and a side of an inner hook being part of the hooks of the U-shape of the female engaging part.

17. The bundling protective member according to claim 1, wherein:

the arrow-shape of the male engaging part is formed like an isosceles triangle in a cross-sectional shape.

18. The bundling protective member according to claim 17, wherein:

the tab is extruded integrally with the vicinity of the tip of the female engaging part on the inner peripheral surface of the transverse-directional protective cover and a side of an inner hook being part of the hooks of the U-shape of the female engaging part.

19. The bundling protective member according to claim 1, wherein:

the arrow-shape of the male engaging part is formed like a shape having a feather-formed part which extends from a tip of the male engaging part to both sides of the male engaging part in a cross-sectional shape, and the U-shape-formed hooks of the female engaging part are shaped such that respective tips of the U-shape of the female engaging part are approaching each other toward the inside.

20. The bundling protective member according to claim 19, wherein:

the tab is extruded integrally with the vicinity of the tip of the female engaging part on the inner peripheral surface of the transverse-directional protective cover and a side of an inner hook being part of the hooks of the U-shape of the female engaging part.

\* \* \* \* \*